United States Patent [19]
Perlmutter

[11] Patent Number: 6,104,802
[45] Date of Patent: Aug. 15, 2000

[54] IN-BAND SIGNALING FOR ROUTING

[75] Inventor: S Michael Perlmutter, San Francisco, Calif.

[73] Assignee: Genesys Telecommunications Laboratories, Inc., San Francisco, Calif.

[21] Appl. No.: 08/972,772

[22] Filed: Nov. 18, 1997

Related U.S. Application Data

[63] Continuation-in-part of application No. 08/879,619, Jun. 20, 1997, which is a continuation-in-part of application No. 08/802,660, Feb. 19, 1997, which is a continuation-in-part of application No. 08/797,407, Feb. 10, 1997.

[51] Int. Cl.[7] .................................................. H04M 7/00
[52] U.S. Cl. ..................... 379/220; 379/221; 379/207; 379/265
[58] Field of Search ..................................... 379/265, 266, 379/309, 201, 210, 211, 220, 221, 229, 230, 207; 370/352

[56] References Cited

U.S. PATENT DOCUMENTS

| | | | |
|---|---|---|---|
| 4,953,204 | 8/1990 | Cuschleg, Jr. et al. | 379/266 |
| 5,062,103 | 10/1991 | Davidson et al. | 379/265 |
| 5,369,695 | 11/1994 | Chakravarti et al. | 379/230 |
| 5,452,350 | 9/1995 | Reynolds et al. | 379/127 |
| 5,533,107 | 7/1996 | Irwin et al. | 379/201 |
| 5,537,470 | 7/1996 | Lee | 379/309 |
| 5,570,420 | 10/1996 | Bress et al. | 379/220 |
| 5,572,579 | 11/1996 | Orriss et al. | 379/142 |
| 5,621,789 | 4/1997 | McCalmont et al. | 379/265 |
| 5,659,604 | 8/1997 | Backmann | 379/220 |
| 5,673,311 | 9/1997 | Andruska et al. | 379/220 |
| 5,684,870 | 11/1997 | Maloney et al. | 379/212 |
| 5,703,943 | 12/1997 | Otto | 379/309 |
| 5,708,702 | 1/1998 | De Paul et al. | 379/230 |
| 5,742,675 | 4/1998 | Kilander et al. | 379/266 |
| 5,793,857 | 8/1998 | Barnes et al. | 379/220 |
| 5,796,813 | 8/1998 | Sonnenberg | 379/220 |
| 5,835,583 | 11/1998 | Hetz et al. | 379/220 |
| 5,841,854 | 11/1998 | Schumacher et al. | 379/265 |
| 5,878,126 | 3/1999 | Velamuri et al. | 379/219 |
| 5,905,792 | 5/1999 | Miloslavsky | 379/265 |

Primary Examiner—Krista Zele
Assistant Examiner—Benny Q. Tieu
Attorney, Agent, or Firm—Donald R. Boys; Central Coast Patent Agency

[57] ABSTRACT

Telephone call routing in networks is provided by forwarding routing data other than origination identification and destination identification in-band with calls, and using the in-band data at call destinations to do further routing. In some embodiments negotiation is accomplished between routers at different points in the network based on the in-band routing data. Practice of the invention extends to intelligent telephony networks and as well to simulated telephone calls between computers in wide area data networks, such as the Internet and Intranets.

9 Claims, 2 Drawing Sheets

IN-BAND SIGNALING FOR ROUTING

CROSS-REFERENCE TO RELATED DOCUMENTS

The present application is a Continuation-In-Part (CIP) of application Ser. No. 08/879,619, filed Jun. 20, 1997, which is a CIP of Ser. No. 08/802,660 filed Feb. 19, 1997, which is a CIP of Ser. No. 08/797,407 filed Feb. 10, 1997, all of which are incorporated herein in their entirety by reference.

FIELD OF THE INVENTION

The present invention is in the field of computer telephony and has particular application to intelligent network call routing.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventor and to those with skill in the art in general. For this reason, much minute detail of known systems is not reproduced here, as to do so would obscure the facts of the invention.

One document which provides considerable information on intelligent networks is "ITU-T Recommendation Q.1219, Intelligent Network User's Guide for Capability Set 1", dated Apr., 1994.

At the time of filing the present patent application there continues to be remarkable growth in telephone-based information systems, which are intelligent networks. Recently emerging examples are telemarketing operations and technical support operations, among many others, which have grown apace with development and marketing of, for example, sophisticated computer equipment. More traditional are systems for serving customers of such as large insurance organizations. In some cases organizations develop and maintain their own telephony operations with purchased or leased equipment, and in many other cases, companies are outsourcing such operations to firms that specialize in such services.

In telephony art, much commercial development is in the area of what are known as call center services and systems, wherein an organization maintains one or more call centers manned by agents of the organization to provide services to clients of the organization. The call centers are typically based on a telephony switch such as a PBX, having incoming trunks and station-side ports connected to agent stations having a least a telephone. Incoming calls are routed to agents based in any of many possible routing criteria. In relatively more state-of-the-art call centers the switches are computer enhanced by being connected to processors running applications for providing additional services not provided by the switch alone. In the art the processes of such enhancement are known as computer telephony integration (CTI). It is to such systems that embodiments of the present invention are principally (but not exclusively) directed. Embodiments will in general be described relative to call centers.

In an intelligent telephony network such as described herein, incoming calls placed from anywhere in the Public Switch Telephone Network (PSTN) are typically routed by computerized systems known in the art as Service Control Points (SCPs.

Additional processors and software may be provided associated with an SCP for further computer enhancement. For example, when a call arrives at a control point, information about the caller may be collected and processed to help determine the final destination of the call. Then according to programmed routing rules, the call may be switched to a call center and then on to an available agent. In many intelligent networks known to the inventor, digital information pertaining to the caller may be sent ahead to a call center by means of a data link separate from the call carrier, the data link implemented between the SCP and the call center, typically through a CTI processor connected to the telephony switch at the call center. Routing in an intelligent network may be accomplished on several levels according to many different protocols.

A problem with routing within a conventional network is that the final destination for a call is often determined before the call leaves the SCP and further routing is largely automated at decentralized telephony switches within the network. This increases the possibility of errors in routing. Calls may be incorrectly routed in the first instance, and, since call transfer is a process that takes a certain length of time, there may be changes while a call is routed, so when the call arrives at the destination, the situation may have changed to the point that the cal will have too be re-routed. Further, the information at an SCP for use in determining routing of calls is typically information updated periodically, and not real-time data.

Another recent development in telephony art is what is known as Internet Protocol Network Telephony (IPNT), wherein conventional telephone calls are simulated between computers over the data network known as the Internet, using microphones and speakers operating with the computers and a graphical user interface operable on each connected computer. Several commercial vendors offer software for simulating such telephony, and similar systems may operate with data networks other than the Internet, such as through company Intranets. At the time of the present patent application such data networks are considered largely "dumb" networks rather than intelligent networks, although some routing is done. Calls are routed in the Internet, for example, by IP addresses, and IP switches and hubs are capable of altering the destination of data packets by controlling IP addresses. In embodiments of the invention that follow, although intelligent telephony networks are used in the main for examples of practicing the invention, the features of the invention are meant to apply as well to IPNT.

What is clearly needed is a better system and method to do call routing whereby determination for routing calls can be shared with decentralized routers in the field without using a separate digital network for transmitting data. In such a system determination of final routing can be made as close as possible to final destination, and information used for routing can be maintained in much closer to real time.

SUMMARY OF THE INVENTION

In a preferred embodiment of the present invention a method for routing a telephone call in a network is provided, comprising steps of (a) attaining, at a first network destination point, routing data associated with the call other than origination identification or first destination identification; (b) forwarding the routing data in-band with the call to a second network point; (c) accessing the routing data at the second network point; and; (d) using the routing data to select a third network destination for the call.

In some embodiments of the method the network is an intelligent telephony network routing telephone calls, and the first destination point is a service control point (SCP). In these embodiments the routing data other than origination identification or first destination identification may be data elicited from a caller. In some embodiments as well, the data is overwritten by a first router at the first network point into one or more data fields conventionally dedicated to information other than the routing data. In such embodiments, in steps (c) and (d) the accessing and using is by a second router at the second network point, and the first router and the second router may negotiate routing path.

In other embodiments the network is a wide area data network., and the telephone calls are simulated calls between two or more computer stations connected to the wide area data network. In the case of call simulation in a wide area network, at the first network destination point a first router writes routing data into one or more data fields in a data packet associated with the call, and forwards the data packet to a second destination point for further routing by a second router using the routing data.

In another aspect of the invention a routing system for telephone calls in a network comprising a first router associated with a first network destination point; and a second router associated with a second network destination point. For a call received at the first network destination point, the first router writes routing data other than call origination identification or first destination identification into one or more data fields conventionally dedicated to other than the routing data, and the second router at the second network destination point uses the routing data from the one or more data fields to further route the call. In systems of the invention the network may be an intelligent telephony network with the first destination point a service control point (SCP) and the second network destination point a computer-telephony integrated (CTI) telephony switch at a call center. In such an embodiment the first router and the second router negotiate based on the data written by the first router into the one or more data fields.

In an alternative aspect of the invention the network may be a wide area data network., and the telephone calls are calls between two or more computer stations connected to the wide area data network rather than between telephones, the computers providing telephone functions. The wide area data network may the Internet, wherein the calls are Internet Protocol Network Telephony calls, or may be an Intranet.

A distinct advantage of the present invention is that no separate data network is necessary in an intelligent telephony network for the purpose of delivering routing data to a second (or further) destination point. Such data arrives with the call or with a data packet associated with the call. Negotiation is still possible, and there is little difficulty in associating the data with an arriving call.

BRIEF DESCRIPTION OF THE DRAWING FIGURES

DESCRIPTION OF THE PREFERRED EMBODIMENTS

Figure 1:
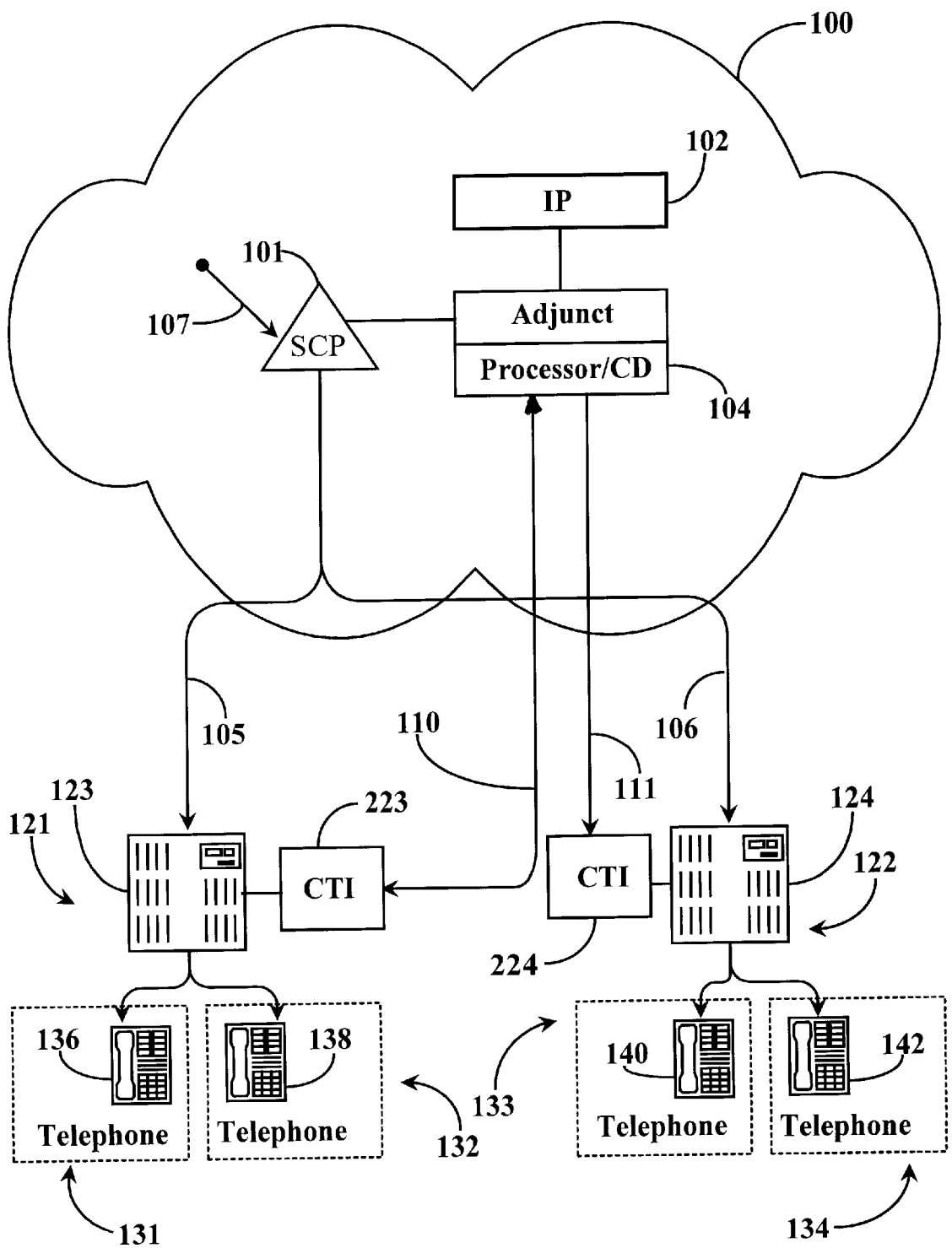
FIG. 1 is a simplified overview of an intelligent network as known to the inventor before the present invention, but not in the public domain.

FIG. 1 is a simplified overview of an intelligent network known to the present inventor wherein incoming calls are represented by a vector 107 arriving at a Service Control Point (SCP) 101 in Network cloud 100. Network cloud 100 may be a Publicly Switched Telephony Network (PSTN), a private network, or any other wide area network (WAN) of telephones and connected equipment.

An adjunct processor 104 in this instance is associated with the SCP, and is provided for the purpose of computer enhancement. Adjunct processor 104 may contain or be connected to other applications known in the art such as a call distributor (CD) and an intelligent peripheral (IP) 102. IP 102 typically provides enhanced capability related to obtaining caller information such as by interactive voice response (IVR) techniques and so on. There may also be additional capabilities attributed to adjunct processor 104 such as an instance of a routing application or an instance of a stat-server, which is a server that stores updated statistical information and provides such information for routing purposes.

When a call 107 arrives at SCP 101, information is typically elicited from the caller using the capabilities of IP 102. This information and information stored in the stat-server, comprising such as agent availability and load statistics, is used to determine routing for call 107. In prior art intelligent networks, routing is typically predetermined before call 107 leaves SCP 101.

Two call centers 121 and 122 are shown in FIG. 1. It will be apparent to those with skill in the art that there may be many more than two such call centers, but two is considered adequate to describe the prior art in the present case. When routing is determined at SCP 101, the incoming call may be switched to either of centers 121 or 122. In the instance shown in FIG. 1, call centers 121 and 122 are computer-enhanced. A computer telephony integration (CTI) processor 223 is connected to switch 123 at center 121 and a CTI processor 224 is connected to switch 124 at center 122. A bi-directional data link 110 connects processor 223 to adjunct processor 104 and a bi-directional data link 111 connects processor 224 to adjunct processor 104.

When routing is determined at SCP 101 to one of call centers 121 and 122, information solicited from a caller may be forwarded via the appropriate data link, 110 or 111, to the call center, where the data may be used for purposes such as a key to retrieve information from a data base to aid an agent in serving the caller.

Call center 121 comprises two agent stations, agent station 131 and agent station 132. Similarly call center 122 comprises two agent stations, agent station 133 and agent station 134. Agent stations 131 through 134 are equipped with telephones 136, 138, 140, and 142 respectively. In some embodiments, agent stations such as described above may have computer platforms connected to video display units (PCNVDUs), not shown in FIG. 1. It will be apparent to one with skill in the art that there may be many more agent stations and telephones. Call 107 is forwarded over lines 105 or 106 to the appropriate call center, depending upon routing determined at the SCP. Upon reaching the call center, call 107 is then distributed to an available agent at one of telephones 136, 138, 140, or 142, via programmed routing executed from either processor 223 or processor 224.

Figure 2:
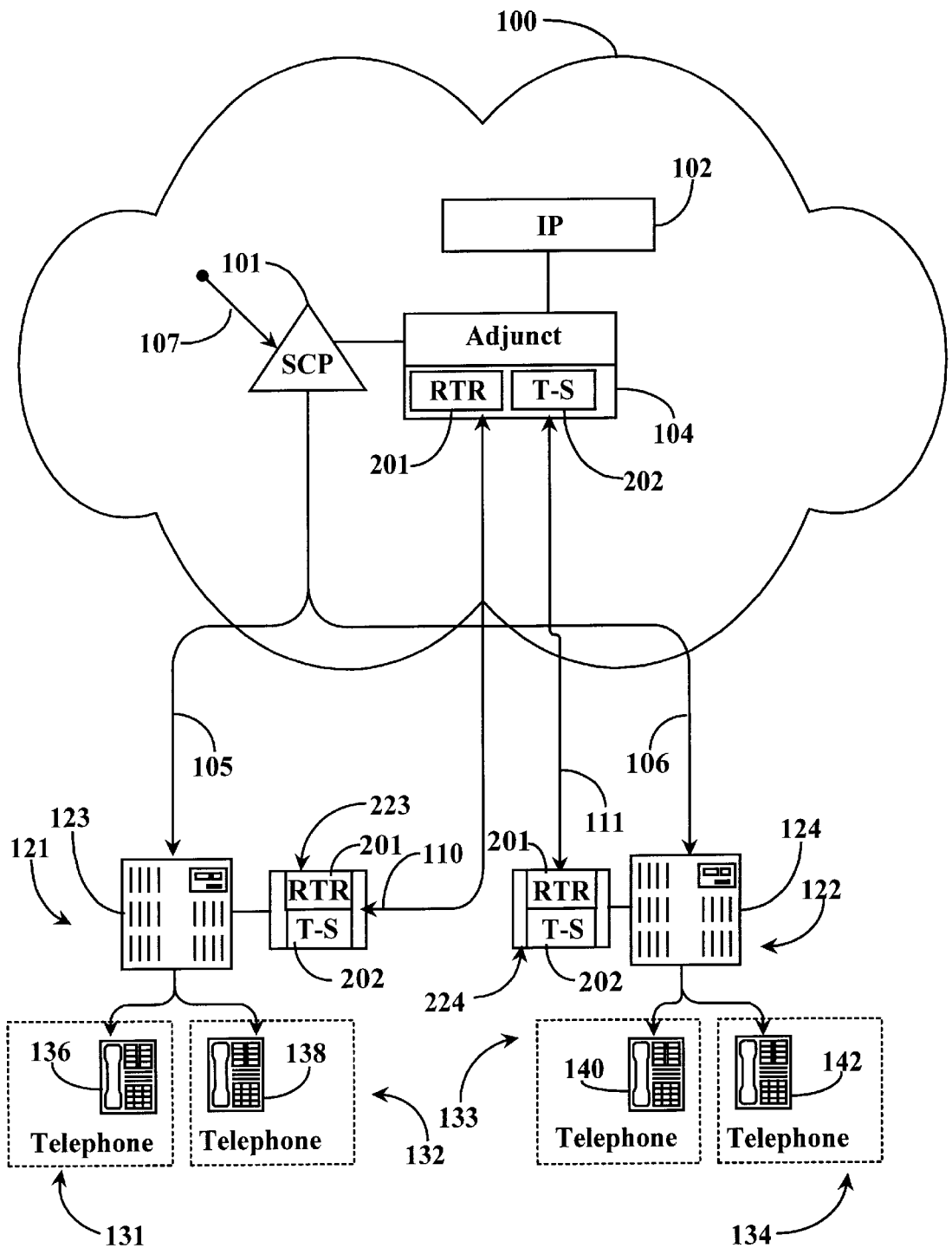
FIG. 2 is a simplified overview of an intelligent network using an in-band signaling technique according to an embodiment of the present invention.

FIG. 2 is a simplified overview of a system according to an embodiment of the present invention wherein a method of in-band signaling is uniquely applied to provide intelligent routing with routing decisions made closer to final call destination, and affording some level of negotiated routing. The system represented by FIG. 2 contains many of the components described above for the system of FIG. 1. Repetition of element introduction is not repeated for FIG. 2.

A typical means of routing calls is by use of the calling party's number and/or the destination number. It is known in the art to transfer such information when forwarding a call, by means of what is known as Automatic Number Information (ANI number) and Destination Number Identification System (DNIS). Depending on the nature of the equipment used, the network itself, and software, the actual mechanisms for providing these numbers may vary. For example, with older analog telephone equipment and lines, a call is sent to a receiving point by coded voltage difference between a pair of wires. In this case, a wink and blink system is used to establish contact, then ANI and/or DNIS numbers may be provided coded as a header to the call before analog audio signals are established.

As another example, using later digital equipment and controlling software, a data packet having data fields dedicated to ANI and/or DNIS may precede a call, making this information available to a receiving station. Data fields are more recognizable in the digital example, but the preceding coded information sent with an analog call may also be considered to be sent in a dedicated field. The nomenclature of a dedicated data field is used herein to include analog calls as well as digital calls.

In either case, analog or digital, the ANI number and DNIS number may be considered "in-band" information. That is, the information accompanies (or precedes) the telephone call, and is transmitted on the same communication link as the telephone call. In the case of IPNT calls, over, for example, the Internet, information is sent by data packets, including fields for various purposes, such as an IP address, in addition to digital audio data. This data may be considered as in-band data as well, and the in-band fields are dedicated fields for a particular purpose. Also, in each case, the protocols and methods by which the in-band information is transmitted are well-known in the art.

In embodiments of the invention described below, available in-band data fields are adapted to carry routing information associated with a telephone call for purposes of routing calls and negotiating routing with routers located at various levels in a network.

Referring now to FIG. 2, a router application 201 and an instance of a CTI application 202 known to the inventors as T-server execute at adjunct processor 104 in the network cloud. Router application 201 uses information typically elicited from callers or retrieved from a database associated with a call, and uses that information along with possibly additional information available to generate routing for calls according to routing protocol in the network. It will be apparent to one with skill in the art that applications such as router application 201 and T-server application 202 may reside in a single processor, or more than one processor that is associated with SCP 101 without departing from the spirit and scope of the present invention. Separation of these applications and processors is done here for illustrative purposes only.

In a preferred embodiment of the present invention CTI processor 223 executes instances of router application 201 as well as T-server application 202. Similarly, CTI processor 224 executes an instance of router application 201 and T-server application 202. Using this particular configuration of a central router and decentralized routers, in-band signaling is practiced between the routers in various embodiments of the invention to provide intelligent interaction between the routers. Existing data fields are used to forward routing information other than ANI and DNIS numbers by manipulating existing in-band signal fields. Such dedicated fields are completely or partially overwritten with routing data, and this information is then transmitted in-band over telephony lines 105 and 106 as described above.

As just one of many possible examples, if it is determined that call 107 is to go to an agent that speaks Spanish and is trained to provide technical assistance with a particular product, then router application 201 at the network level would, in an embodiment of the invention, overwrite a portion of an in-band signal field with this information. It will be apparent to those with skill in the art that this data set is but one of very many that might be extant in different situations for different organizations.

There are a number of existing fields in telephony that may be utilized. For example, in the AT&T™ network there is a Customer Data Field (CDPD) provided by the carrier at the SCP and then delivered and used by a G3-type switch. This field may be used to provide in the telephone call a key or actual data, or a combination of the two. In other networks, such as MCI for example, there are similar fields whose conventional use may be coopted for routing purposes. The Destination Number Information Service (DNIS) field may be similarly over written with routing data.

Router application 201 has the ability to configure and execute routing data overwrites to different fields generic to different switches and or networks such as AT&T, MCI, Rockwell, Lucent or Northern Telecom, and so on. The manipulated in-band signal then carries the routing data over, for example, conventional telephony line 105 to telephony switch 123 where an instance of router application 201 residing in CTI processor 223 can read the information and use it to route call 107 to an agent connected to a station-side port at the call center. By utilizing in-band signaling for routing, in some instances network connections 110 and 111 can be eliminated. All routing in such embodiments can be provided in the form of in-band signaling from the network to routers at lower levels.

There are some possible problems which have occurred to the inventor. For example, it is inevitable that there may be some mistakes on occasion in initial routing of calls with in-band data. A problem may arise because in-band signaling for routing purposes may seem at first glance to be single-directional, from the higher-level router to the lower. In various embodiments of the invention, however, a level of negotiation may yet be provided between the higher-level router and the lower. For example, in one embodiment, software may be provided associated with both sending and receiving routers such that if the receiving router is not prepared to handle a particular call by the nature of the in-band routing data, the receiving router may cause the receiving equipment to respond to the call with a busy signal. The busy signal may be interpreted by the sending router as a return signal that the call is refused, and should be routed to an alternative destination. Similarly a number-of-rings (time) protocol could accomplish similar negotiation.

In some embodiments using ISDN lines in place of conventional telephony lines, additional communication between instances of router application 201 in bi-directional fashion is possible, as a return signal may be sent over one of the ISDN channels.

It will be apparent to those with skill in the art that an intelligent network such as the one described with reference to FIG. 2 wherein in-band signaling is manipulated to provide routing instruction may be implemented in a wide variety of architectures without departing from the spirit and scope of the present invention. For example, such an intelligent network scheme may comprise many call-centers and CTI-enhanced telephony switches, may or may not employ a separate network for data communication between routing points in the network, and may use different types of telephony lines or trunks.

In the matter of IPNT, it should be apparent that an Internet call, for example, may be directed to a first destination, which may be adapted to communicate with and elicit information from a caller, and also in some instances to retrieve additional information from stored resources. Routing intelligence at the first destination may then encode all or part of such information in one or more data fields of data packets and direct the data packets to a second destination, wherein the encoded in-band data may be used to further route the call. Negotiation may be accomplished between the first and the second routers resulting in further routing determination, and there is no real limit to the number of iterations that may be performed. Thusly, as in an intelligent network as described above, routing may be forced to levels closer and closer to final destinations, where decisions may be made on information more apt to be closer to real-time.

It will also be apparent to those with skill in the art that the method of the present invention wherein in-band signaling is used may be adapted to differing types of telephony switches without departing from the spirit and scope of the present invention. It is well known that the functions of telephony switches offered by different manufacturers may vary. However, the in-band signaling properties available with these switches are similar so that a router could be adapted to overwrite the data fields therein. A routing application may be programmed to enable the overwrite of in-band signal fields of several different switches that may be employed on the same network. There are many such possibilities many of which have already been described. The spirit and scope of the present invention is limited only by the claims that follow.

What is claimed is:

1. A method for routing a telephone call in a network comprising steps of:
   (a) attaining, at a service control point, routing data associated with the call other than origination identification or first destination identification;
   (b) writing the routing data in-band, in a data field conventionally dedicated to information other than routing data, with the call to forward to a second network point serviced by a computer-telephony integration (CTI) system;
   (c) accessing the routing data at the second network point by the CTI system; and;
   (d) using the routing data to select a third network destination for the call.

2. The method of claim 1 wherein, in step (a) the routing data other than origination identification or first destination identification is data elicited from a caller.

3. The method of claim 1 wherein, in steps (c) and (d) the accessing and using is by a second router at the second network point, and wherein the first router and the second router negotiate routing path.

4. The method of claim 1 wherein the network is a wide area data network, and the telephone calls are simulated calls between two or more computer stations connected to the wide area data network.

5. The method of claim 4 wherein at the first network destination point a first router writes routing data into one or more data fields in a data packet associated with the call, and forwards the data packet to a second destination point for further routing by a second router using the routing data.

6. A routing system for telephone calls in a network comprising:
   a first router associated with a service control point; and
   a second router associated with a second network destination point serviced by a computer-telephony intergration (CTI) system;
   wherein, for a call received at the service control point, the first router writes routing data other than call origination identification or first destination identification into one or more data fields in a data packet associated with the call conventionally dedicated to other than the routing data, and the second router at the second network destination point uses the routing data from the one or more data fields to further route the call.

7. The system of claim 6 wherein the first router and the second router negotiate based on the data written by the first router into the one or more data fields.

8. The system of claim 6 wherein the network is a wide area data network, and the telephone calls are calls between two or more computer stations connected to the wide area data network rather than between telephones, the computers providing telephone functions.

9. The system of claim 8 wherein the wide area data network is the Internet, and wherein the calls are Internet Protocol Network Telephony calls.

* * * * *